US010221823B2

(12) United States Patent
Traina

(10) Patent No.: US 10,221,823 B2
(45) Date of Patent: Mar. 5, 2019

(54) METHOD OF HEATING AND RETAINING HEAT IN AN INTERNAL COMBUSTION ENGINE TO IMPROVE FUEL ECONOMY

(76) Inventor: John E. Traina, Pittsburgh, PA (US)

( * ) Notice: Subject to any disclaimer, the term of this patent is extended or adjusted under 35 U.S.C. 154(b) by 2663 days.

(21) Appl. No.: 11/520,517

(22) Filed: Sep. 13, 2006

(65) Prior Publication Data

US 2008/0061051 A1 Mar. 13, 2008

(51) Int. Cl.
*B60L 1/02* (2006.01)
*F02N 19/10* (2010.01)

(52) U.S. Cl.
CPC .......... *F02N 19/10* (2013.01); *F01P 2037/02* (2013.01)

(58) Field of Classification Search
CPC ...... B60H 1/2225; B60H 1/2218; B60H 1/00; B60H 2001/2287; B60H 2001/2293; B60H 1/00271; F02N 19/10; F01P 2037/02
USPC ................................ 219/205, 202, 208, 531
See application file for complete search history.

(56) References Cited

U.S. PATENT DOCUMENTS 1,267,416 A 5/1918 Jacob
1,683,920 A 9/1928 Rohne
2,417,636 A * 3/1947 Ditzler et al. ............ 126/110 R
2,418,097 A * 3/1947 Ruff .............................. 432/221
2,470,485 A 5/1949 Haugland
2,810,059 A 10/1957 Miedema
2,819,373 A * 1/1958 Allman ......................... 219/202
2,855,908 A * 10/1958 Pflaum .......................... 123/262
2,866,839 A * 12/1958 Kaehni .......................... 123/637
3,213,994 A * 10/1965 Hohler .......................... 194/241
3,300,619 A * 1/1967 Nilssen .......................... 392/307
3,469,072 A * 9/1969 Carlson ......................... 219/202
3,585,358 A * 6/1971 Nilssen .......................... 219/202
3,690,371 A * 9/1972 Potter et al. .................. 165/297
3,696,730 A * 10/1972 Masuda et al. .......... 237/12.3 A
3,842,819 A * 10/1974 Atkins et al. ......... 123/169 MG
3,888,336 A * 6/1975 Zajic ............................. 191/1 R
3,911,874 A * 10/1975 Vincent ......................... 123/274
4,041,922 A * 8/1977 Abe et al. ...................... 123/260
4,188,527 A * 2/1980 Follmer ......................... 219/202
4,232,211 A * 11/1980 Hill ............................... 219/202
4,332,224 A * 6/1982 Latsch et al. ................. 123/254
4,398,081 A * 8/1983 Moad ............................ 219/202
4,485,778 A * 12/1984 Oliver ........................... 123/254
4,575,003 A * 3/1986 Linker et al. ............ 237/12.3 R
4,591,691 A 5/1986 Badali
4,644,915 A * 2/1987 Afshar ................... 123/142.5 R
4,678,982 A * 7/1987 Offiler et al. .................. 322/81
4,684,818 A * 8/1987 Carlson ........................ 307/10.1
4,692,684 A * 9/1987 Schaeffer ........................ 322/90
4,700,888 A * 10/1987 Samulak ....................... 237/2 A
4,780,619 A * 10/1988 Campbell et al. ........... 307/10.1
4,847,468 A * 7/1989 Hufstetler ..................... 219/203
(Continued)

*Primary Examiner* — Eric S Stapleton
(74) *Attorney, Agent, or Firm* — Buchanan Ingersoll & Rooney PC

(57) ABSTRACT

A method improving fuel economy by the retention of heat in or heating a liquid cooled, internal combustion engine is provided wherein insulation, a heating member, or both are attached to the engine and used to reduce heat loss from the engine or keep the engine at an operating temperature. The engine is subsequently maintained at the operating temperature or a temperature substantially close thereto for either a period of time determined by a user or for a time period that is longer than time periods obtained by following standard practices.

20 Claims, 2 Drawing Sheets

(56) References Cited

U.S. PATENT DOCUMENTS

| | | | | | |
|---|---|---|---|---|---|
| 4,862,951 | A | * | 9/1989 | Muller et al. | 165/41 |
| 4,944,343 | A | * | 7/1990 | Muller | 165/47 |
| 4,947,053 | A | * | 8/1990 | Campbell et al. | 307/10.1 |
| 5,017,758 | A | * | 5/1991 | Kirkman et al. | 219/205 |
| 5,055,656 | A | * | 10/1991 | Farah et al. | 219/209 |
| 5,068,589 | A | * | 11/1991 | Offiler et al. | 322/7 |
| 5,249,623 | A | * | 10/1993 | Muller et al. | 165/156 |
| 5,263,565 | A | * | 11/1993 | Wilkinson | 194/216 |
| 5,266,773 | A | * | 11/1993 | Granborg | 219/202 |
| 5,280,158 | A | * | 1/1994 | Matava et al. | 219/492 |
| 5,281,792 | A | * | 1/1994 | Lee et al. | 219/209 |
| 5,352,862 | A | | 10/1994 | Barr | |
| 5,411,005 | A | * | 5/1995 | Bohl et al. | 123/557 |
| 5,443,053 | A | * | 8/1995 | Johnson | 123/557 |
| 5,813,361 | A | * | 9/1998 | Milliman | 114/361 |
| 5,994,669 | A | * | 11/1999 | McCall | 219/209 |
| 6,232,577 | B1 | * | 5/2001 | Reiff | 219/205 |
| 6,364,010 | B1 | * | 4/2002 | Richman et al. | 165/202 |
| 6,441,343 | B1 | * | 8/2002 | Granborg | 219/202 |
| 6,444,952 | B2 | * | 9/2002 | Ballem et al. | 219/205 |
| 6,591,896 | B1 | * | 7/2003 | Hansen | 165/51 |
| 8,581,157 | B2 | * | 11/2013 | Springer et al. | 219/542 |

* cited by examiner

METHOD OF HEATING AND RETAINING HEAT IN AN INTERNAL COMBUSTION ENGINE TO IMPROVE FUEL ECONOMY

FIELD OF THE INVENTION

The present invention relates to a method of increasing the fuel economy by heating or maintaining the temperature of an internal combustion engine to or at its operating temperature.

BACKGROUND OF THE INVENTION

Prior to sufficiently warming to an operational temperature, an internal combustion engine requires a rich fuel mixture to operate. Once the engine warms to its operating temperature, which generally takes about twenty minutes for automobile engines, a lean fuel mixture is used. Thus, an internal combustion engine is less fuel efficient when it operates at temperatures below its operating temperature. In addition certain features of the automobile intended to increase fuel economy, such as "lockup clutch" are not evoked until the engine has reached operating temperature.

Fuel efficiency in engines and automobiles is a substantial problem due to the increasing fuel costs associated with operating internal combustion engines. This is particularly true with respect to engines that run on oil based fuels. Consequently, the industry has been encouraged to provide engines with improved fuel efficiency or mechanisms that may improve the fuel efficiency of an engine.

Devices have previously been disclosed for purposes of heating an engine or engine components to improve engine performance. For example, U.S. Pat. No. 3,213,994 to Hohler discloses the use of coin operated electricity dispensing meters for use in heating the engines of parked cars. The electric meter powers an engine heating device to warm the engine prior to the required use of the engine. Hohler teaches that the purpose of heating the engine is to avoid the problem of starting vehicles that must be left out in the open during cold weather.

Similarly, U.S. Pat. No. 5,352,862 to Barr discloses the use of a heater to attach to an engine to heat an oil pan sufficiently to decrease the viscosity of the oil and permit the engine to start when exposed to extremely cold temperatures. However, Barr teaches that oil pans should be heated as little as possible to sufficiently decrease the oil viscosity for engine starting purposes.

The use of heaters has also been disclosed for purposes of preventing damage associated with an engine's exposure to freezing temperatures. For example, U.S. Pat. No. 5,813,361 to Milliman discloses the use of a heating element inside a protective cover of a boat engine to protect the engine from damage caused by water that freezes inside the engine. Milliman teaches that the heating element should be activated once the engine temperature reaches 32° F. and that the heating element should maintain the engine above a water freezing temperature. Specifically, Milliman teaches that an engine should be maintained at a temperature range of 32° F. to 40° F. to prevent such damage.

Consequently, there remains a need to provide a mechanism that improves fuel efficiency of an engine by substantially decreasing or eliminating the need for the engine to run on a rich fuel mixture.

SUMMARY OF THE INVENTION

I provide a method of heating a liquid cooled, internal combustion engine, such as is used in an automobile. A heating member attached to the engine is normally activated while the engine is not running, or deactivated. The heating member then heats or helps to heat the engine to its operating temperature. Once the engine is at or near its operating temperature, the temperature of the engine is maintained at that temperature. Alternatively, the heating member could be used immediately after the engine has been shut off to maintain the engine at its operating temperature.

Other details, objects, and advantages of my invention will become apparent as the following description of certain present preferred methods of practicing the invention proceeds.

BRIEF DESCRIPTION OF THE DRAWINGS

In the accompanying drawings I have shown present preferred embodiments of my invention and have illustrated certain present preferred methods of practicing the same.

DETAILED DESCRIPTION OF PRESENT PREFERRED EMBODIMENTS

Figure 1:
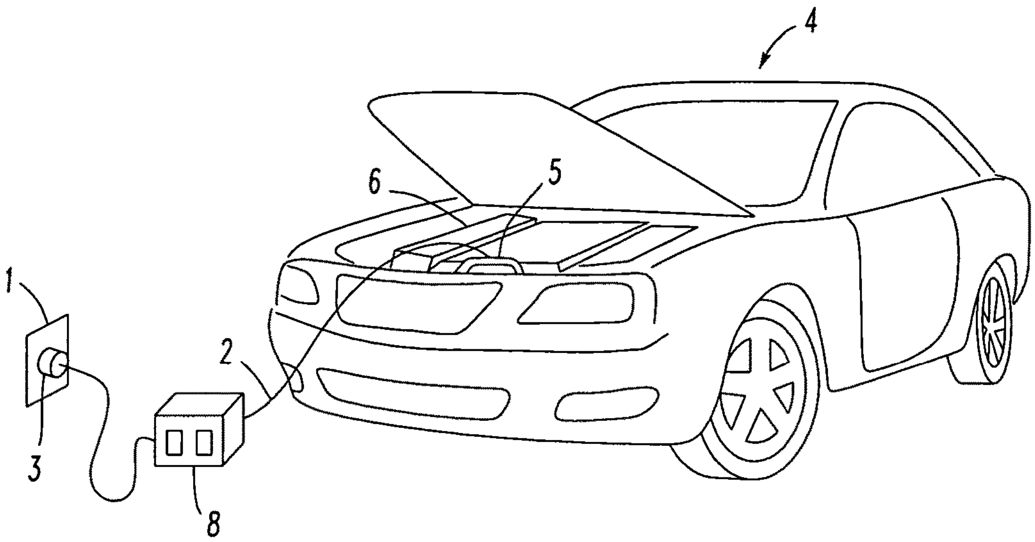
FIG. 1 is a perspective view of a first present preferred embodiment of my invention.

A first present preferred embodiment of my invention is shown in FIG. 1. Automobile 4 is parked and has an engine 6. Heating element 5 is attached to the engine 6. Heating element 5 is powered by electricity, which is conducted by cord 2 from a power outlet 1.

Heating element 5 is activated when plug 3 is plugged into outlet 1 and an operator adjusts controller 8 to turn the heating element on to heat the automobile engine to its operating temperature. Outlet 1 is a source of electricity which produces heat through the heating element. Any power source capable of producing heat can be used. Heating element 5 then heats the engine 6 until the engine is at an operating temperature. Controller 8 then adjusts the heat provided by heating element 5 to maintain the engine temperature at this operating temperature or a temperature substantially close thereto. The controller may have a timer which the user could set to activate the heating element at selected times. In that way a user may set the timer to activate the heating element an hour before the typically leaves for work. A feedback temperature sensor may be added to the controller and attached to the engine 6 for more precise control. In one embodiment the user may disconnect and remove the heating element 5 and subsequently activate the engine before the engine has cooled substantially below its operating temperature to maintain the engine at its operating temperature. In another embodiment the heating and insulating unit remains on the engine and only the power cord is disconnected before using the vehicle. In another embodiment the heating element 5 is used in conjunction with an active engine wherein both the heating element and the internal combustion in the engine work together to bring the engine to operating temperature more rapidly than would be achieved individually. In this way less fuel is expanded.

It should be noted that operating temperatures may differ for different types of engines. Thus, it should be understood that "operating temperature," as used in this specification refers to the approximate temperature of an engine when the engine is operating at or near full engine performance. At that time the engine's fuel system is providing a lean fuel mixture. The operating temperature of a typical operating engine is between 150 and 250 degrees Fahrenheit.

It should also be noted that the heating member may be activated in various ways. First, the heating member can be activated by providing power directly to the heating member. This is typically accomplished by directly connecting a power cord attached to the heating member to a power source or by moving an on/off switch attached to the heating member to the "on" position after the heating member has been connected to a power source. Second, the heating member may be activated by turning a controller, such as a thermostat, attached to the heating member on. The controller then energizes and deenergizes the heating member as necessary to maintain the engine at its operating temperature.

Figure 2:
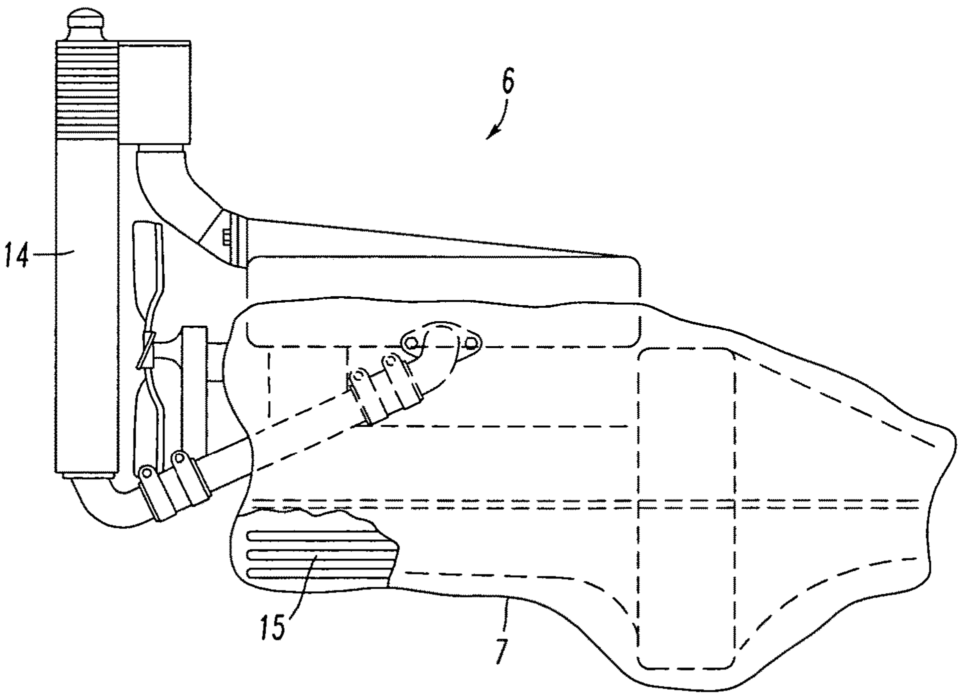
FIG. 2 is a perspective view of a second present preferred embodiment of my invention with a part of the insulated blanket cut away to show a heating element.

An insulated blanket 7 having a heating coil 15, as shown in FIG. 2, can be used to heat the engine and keep it at operating temperature. The insulated blanket 7 covers at least a portion of the engine 6. For example, the blanket 7 may cover the top of the engine, a portion of the top of the engine, or a portion of a side of the engine. The heating coil 15 provides heat to heat the engine and the insulated blanket 7 insulates the engine from heat lost to the surrounding atmosphere. The insulating property of the blanket reduces the amount of heat the heating coil 15 must provide to heat the engine 6 to its operating temperature. Similarly, the insulated blanket allows the heating coil to use less energy to maintain the engine at its operating temperature.

While FIG. 2 illustrates a blanket as the insulating body, this structure could be a series of panels or other formed structures sized and configured to fit a particular engine or series of engines. I prefer to use fiberglass or any other high temperature insulation that is inexpensive and capable of being formed to the engine dimensions easily.

Figure 3:
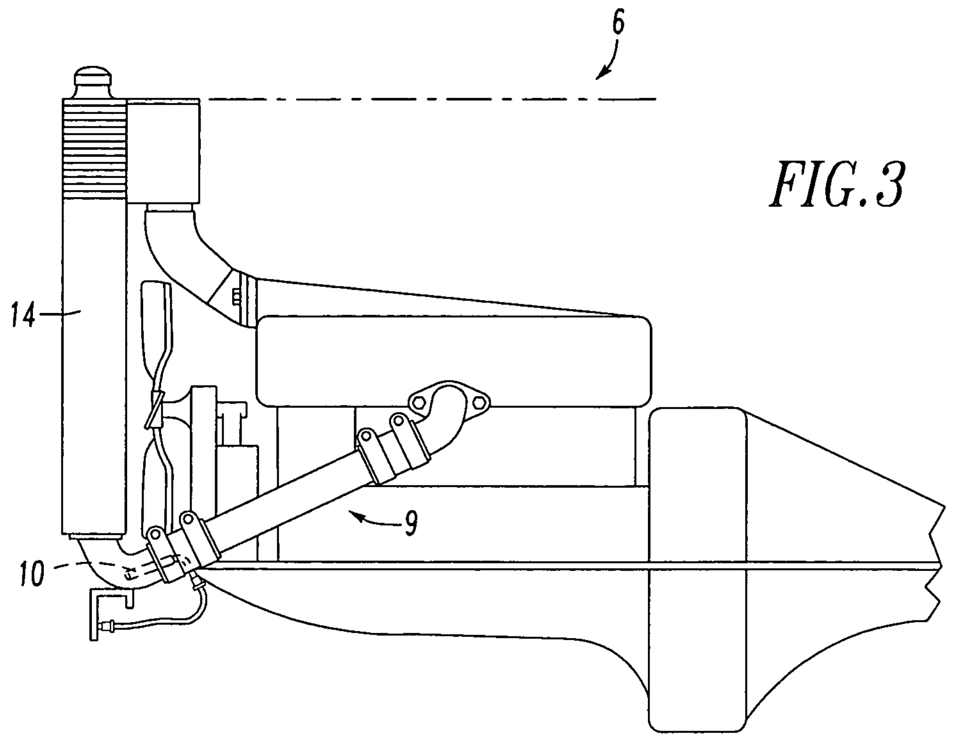
FIG. 3 is a perspective view of a third present preferred embodiment with a portion of the engine block cut away.
Figure 4:
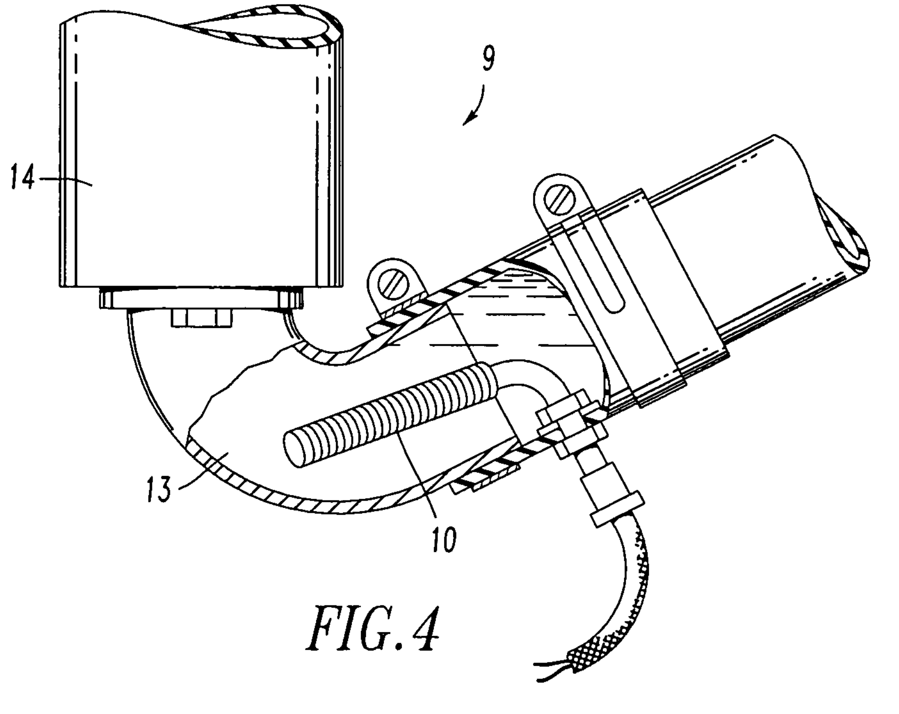
FIG. 4 is an enlarged perspective view of the third present preferred embodiment with a portion of the water cooling system cut away.

A third present preferred embodiment is shown in FIGS. 3 and 4. A heating coil 10 is attached to the cooling system 9 of an engine 6. The cooling system comprises a coolant reservoir 14, coolant 13, and a heat exchanger. An operator activates the heating coil 10 to heat the coolant 13 within the cooling system 9 until the engine is heated to its operating temperature. The heating coil is then controlled by a controller to maintain the engine at its operating temperature or a temperature substantially close thereto.

A fourth present preferred embodiment of my invention involves providing insulation over at least a portion of an engine. The insulation acts, similarly to the insulated blanket 7 shown in FIG. 2, to retain the heat inside the engine by slowing the heat transfer from the engine. Thus, when an engine is deactivated after it has reached its operating temperature, the engine stays at this temperature for a longer period of time than if the insulation was not provided. Similarly, the insulation keeps the engine at a temperature substantially close to its operating temperature for a longer time period than if the insulation was not provided.

The insulation may be provided by attaching insulation to the engine so that the insulation will insulate the engine when it is in operation and when it is deactivated. In an alternative embodiment, the engine is covered with an insulating cover after deactivation. In this alternative embodiment, the insulating cover may then be removed prior to reactivating the engine or after activating the engine.

It should be understood that the insulation provided over at least a portion of the engine increases the time it takes for the engine to cool below its operating temperature. This increase in time depends upon the thickness and type of insulation used and the portion of the engine being insulated as well as ambient conditions.

I prefer to use this fourth present preferred embodiment of my invention when using an engine throughout a substantial time period that includes brief stoppages in operation where alternative power sources for maintaining the operating temperature of the engine may not be available, such as making brief rest stops along an interstate during a long trip in an automobile. The insulation prevents the engine from losing enough heat to cool substantially below its operating temperature. Thus, an operator that makes brief stops during a long trip in a car will use less fuel than he would have without the insulation.

It should be understood that the insulation can be sold as part of an engine manufactured for an automobile or sold as a kit capable of being installed on or in an engine by a mechanic or owner. Similarly, a heating member can be sold as part of an engine manufactured for an automobile or sold as a kit capable of being installed on or in an engine by a mechanic or owner. Thus, a heating member, such as one comprising the heating element 5 shown in FIG. 1, the heating coil 10 shown in FIGS. 3 and 4, or the blanket 7 and coil 15 shown in FIG. 2, could be installed by the engine manufacturer and sold as part of the engine or a vehicle containing the engine.

The present preferred embodiments for the heating member use electricity. It should be understood that other sources of heat energy including but not limited to, gasoline, kerosene, natural gas, LP gas or diesel fuel may be used as a heat source.

It should also be understood that an engine that has recently been deactivated may be at its operating temperature. Before the engine substantially cools, the heating member, such as heating coil 10, may be activated to preserve the engine at its operating temperature. Similarly, a user could attach a heating member, such as the heating members shown in FIG. 1 or 2, to the engine before it has cooled below its operating temperature and activate the heating element to keep the deactivated engine at its operating temperature or a temperature substantially close thereto. These preemptive actions would reduce energy costs associated with the operation of the heating member because the heating member would not need to heat the engine from an ambient temperature to its operating temperature.

While I have shown and described certain presently preferred methods of practicing my invention, it is to be distinctly understood that the invention is not limited thereto, but may be otherwise variously embodied and practiced within the scope of the following claims.

I claim:

1. A method of increasing the fuel economy of an engine having a cooling system containing a coolant by heating the engine and coolant, the steps of the method comprising:

activating a heating member attached to the engine;

heating the engine and coolant with the heating member until the engine is heated to an operating temperature at which the engine operates on a lean fuel mixture, such heating being done while the engine is not running; and maintaining the engine at the operating temperature.

2. The method of claim 1, wherein the heating member comprises an electric blanket or a heating coil.

3. The method of claim 1, wherein the engine has a cooling system and the heating member comprises a heating coil attached to the cooling system.

4. The method of claim 1, wherein the heating member comprises a heating body attached to insulation.

5. The method of claim 4, further comprising attaching the heating member to the engine.

6. The method of claim 4, wherein the insulation is fiberglass.

7. The method of claim 1, further comprising connecting the heating member to a power source capable of producing heat.

8. The method of claim 1, further comprising attaching the heating member to the engine.

9. The method of claim 8, further comprising separating the heating member from the engine.

10. The method of claim 1, further comprising covering at least a portion of the engine with insulation.

11. The method of claim 1, wherein the heating member comprises a controller attached to a heating body.

12. The method of claim 1, wherein the operating temperature is between 150° F. to 250° F.

13. A method of retaining heat in a deactivated engine which, prior to deactivation, had been at an operating temperature at which the engine operates on a lean fuel mixture, the engine having a cooling system containing a coolant the steps of the method comprising:

attaching a heating member to the engine, activating the heating member to heat the engine and coolant with the heating member to the operating temperature at which the engine operates on a lean fuel mixture, such heating being done while the engine is not running;

providing insulation over a sufficient portion of the engine block so that upon restarting the engine uses less fuel than the engine would use without the insulation; and keeping the deactivated engine at the operating temperature.

14. The method of claim 13, wherein the engine has a cooling system and the heating member is a heating coil attached to the cooling system.

15. The method of claim 13, wherein the heating member is attached to the insulation.

16. The method of claim 13, further comprising connecting the heating member to a power source capable of producing heat.

17. The method of claim 13, wherein the heating member comprises an electric blanket or a heating coil.

18. The method of claim 13, wherein the heating member comprises a controller attached to a heating body.

19. The method of claim 13, wherein the insulation is fiberglass.

20. The method of claim 13, the operating temperature being about 150° F. to 250° F.

* * * * *